United States Patent
Ciocchini et al.

(10) Patent No.: US 12,548,630 B2
(45) Date of Patent: Feb. 10, 2026

(54) MEDIA MANAGEMENT SCANNING WITH UNIFIED CRITERIA TO ALLEVIATE FAST AND LATENT READ DISTURB

(71) Applicant: MICRON TECHNOLOGY, INC., Boise, ID (US)

(72) Inventors: Nicola Ciocchini, Boise, ID (US); Animesh Roy Chowdhury, Boise, ID (US); Kishore Kumar Muchherla, San Jose, CA (US); Akira Goda, Tokyo (JP); Jung Sheng Hoei, Newark, CA (US); Niccolo' Righetti, Boise, ID (US); Jonathan S. Parry, Boise, ID (US); Ugo Russo, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 69 days.

(21) Appl. No.: 18/505,855

(22) Filed: Nov. 9, 2023

(65) Prior Publication Data
US 2024/0161838 A1  May 16, 2024

Related U.S. Application Data

(60) Provisional application No. 63/426,033, filed on Nov. 16, 2022.

(51) Int. Cl.
*G11C 16/00* (2006.01)
*G11C 7/04* (2006.01)
(Continued)

(52) U.S. Cl.
CPC ........... *G11C 16/3431* (2013.01); *G11C 7/04* (2013.01); *G11C 16/32* (2013.01)

(58) Field of Classification Search
CPC ..... G11C 16/32; G11C 16/26; G11C 16/3431; G11C 7/04; G11C 11/5642; G11C 16/10; G11C 16/3418; G11C 2029/0409; G11C 29/50012; G11C 29/42; G11C 29/44; G11C 16/3404; G11C 2029/0411; G11C 29/4401; G11C 29/52; G11C 16/0483; G11C 16/30; G11C 29/021; G11C 29/028; G11C 29/06; G11C 29/50004; G11C 11/22; G11C 11/40626; G11C 13/0004; G11C 13/0023;
(Continued)

(56) References Cited

U.S. PATENT DOCUMENTS 10,503,410 B2 * 12/2019 Yu .......................... G06F 3/0653

* cited by examiner

*Primary Examiner* — Thong Q Le
(74) *Attorney, Agent, or Firm* — Lowenstein Sandler LLP

(57) ABSTRACT

A system may include a memory device comprising a plurality of memory blocks, and a processing device to, responsive to receiving a request to read a memory block from the memory device, determine a time difference between a current time and a timestamp associated with the memory block, determine whether the time difference satisfies a first threshold increment criterion, responsive to determining that the time difference satisfies the first threshold increment criterion, increment a read counter associated with the memory block by a first increment value associated with the first threshold increment criterion, determine that the read counter associated with the memory block satisfies a threshold scan criterion, and responsive to determining that the read counter satisfies the threshold scan criterion, perform a media scan with respect to the memory block.

20 Claims, 12 Drawing Sheets

(51) Int. Cl.
*G11C 16/32* (2006.01)
*G11C 16/34* (2006.01)

(58) Field of Classification Search
CPC ............ G11C 13/0035; G11C 13/0038; G11C 13/004; G11C 13/0069; G11C 16/0466; G11C 2013/0083; G11C 29/1201; G11C 8/06; G11C 8/12
See application file for complete search history.

900

| Read-to-read (R2R) Delay Range 902 | Read Count Increment 904 |
|---|---|
| DelayRange1 (e.g., between 0 and Th1=1 second) | Increment1 (e.g., 1 read) |
| DelayRange2 (e.g., greater than Th1) | Increment2 (e.g., 2 reads) |

| Read-to-read (R2R) Delay Range 912 | Read Count Increment 914 |
|---|---|
| DelayRange1 (e.g., between 0 and Th1 seconds) | Increment1 (e.g., 1 read) |
| DelayRange2 (e.g., between Th1 and Th2) | Increment2 (e.g., 2.5 reads) |
| DelayRange3 (e.g., between Th2 and MaxVal) | Increment3 (e.g., 5 reads) |

| Read-to-read (R2R) Delay Range 1002 | Read Count Threshold to Trigger Random Scan 1004 |
|---|---|
| DelayRange1 (e.g., between 0 and Th1=1 second) | TriggerCount1 (e.g., 10000 reads) |
| DelayRange2 (e.g., Th1 to MaxVal) | TriggerCount2 (e.g., 5000 reads) |

| | Read Disturb Management Parameters 1102 | |
|---|---|---|
| Temperature Range 1104 | Read-to-read (R2R) Delay Range 1106 | Read Count Increment 1108 |
| TempRange1 (e.g., 0-40C) | DelayRange1 (e.g., 0 to Th1) | Increment1 (e.g., 1.5 reads) |
| | DelayRange2 (e.g., Th1 to MaxVal) | Increment2 (e.g., 2.5 reads) |
| TempRange2 (e.g., greater than 40C) | DelayRange3 (e.g., 0 to Th1) | Increment3 (e.g., 1 reads) |
| | DelayRange4 (e.g., Th1 to MaxVal) | Increment4 (e.g., 2 reads) |

FIG. 11

MEDIA MANAGEMENT SCANNING WITH UNIFIED CRITERIA TO ALLEVIATE FAST AND LATENT READ DISTURB

REFERENCE TO RELATED APPLICATIONS

This application claims the benefit of U.S. Provisional Application No. 63/426,033, filed Nov. 16, 2022, which is incorporated by reference herein.

TECHNICAL FIELD

Embodiments of the disclosure relate generally to memory sub-systems, and more specifically, relate to media management scanning for fast and latent read disturb regimes.

BACKGROUND

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure. The drawings, however, should not be taken to limit the disclosure to the specific embodiments, but are for explanation and understanding only.

FIGS. 9A-9B illustrate example lookup tables that associate read-to-read delay ranges with respective read counter increment values in accordance with some embodiments.

FIG. 10 illustrates an example lookup table that associates read-to-read delay ranges with respective read count thresholds that can trigger random scans in accordance with some embodiments.

FIG. 11 illustrates an example lookup table that associates read-to-read delay ranges with respective read counter increment values for different temperature ranges in accordance with some embodiments.

DETAILED DESCRIPTION

Figure 1A:
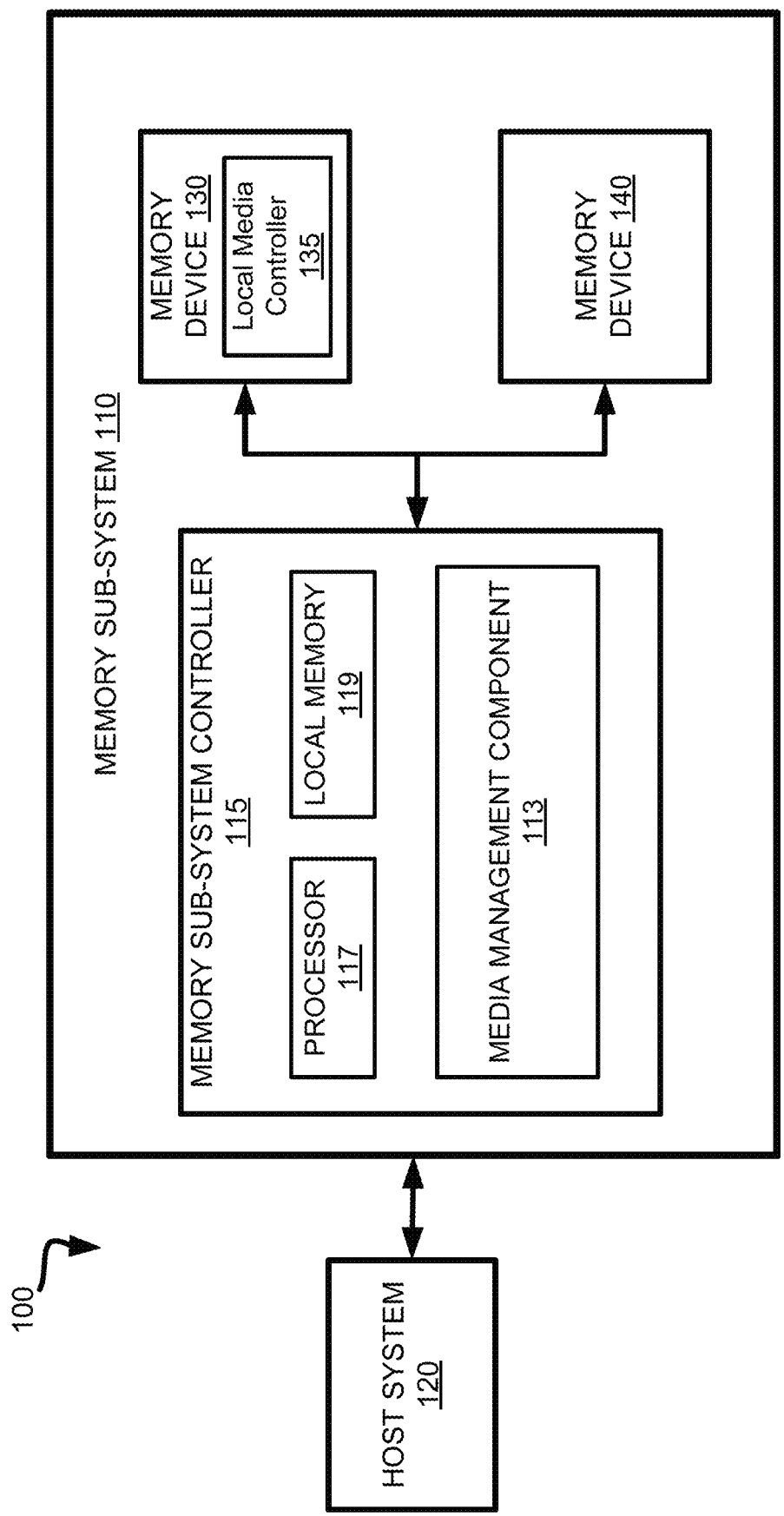
FIG. 1A illustrates an example computing system that includes a memory sub-system in accordance with some embodiments of the present disclosure.
Figure 1B:
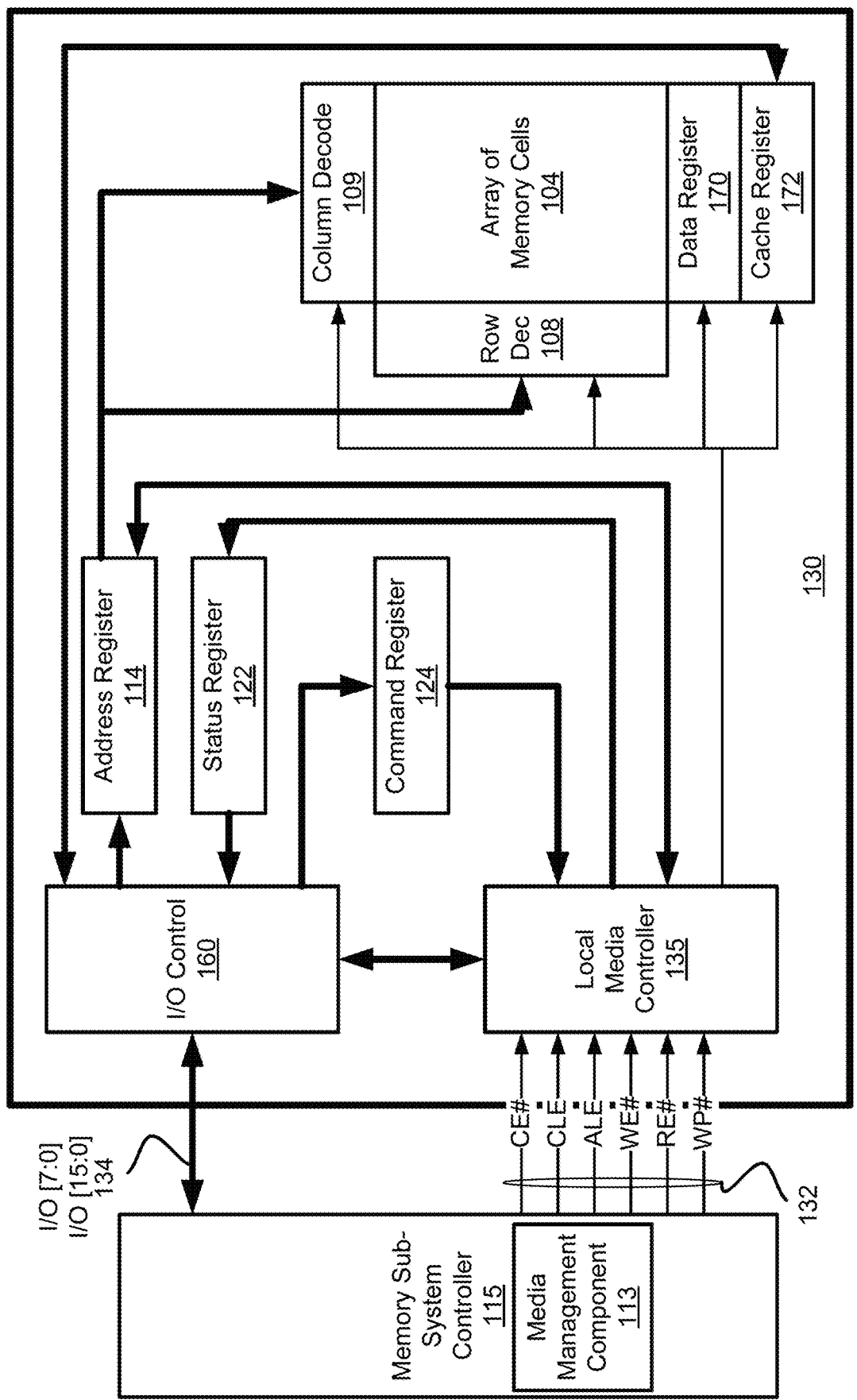
FIG. 1B is a block diagram of a memory device in communication with a memory sub-system controller of a memory sub-system, in accordance with some embodiments of the present disclosure.

Aspects of the present disclosure are directed media management scanning for fast and latent read disturb regimes. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1A. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional grid. Memory cells are formed (e.g., etched) onto a silicon wafer in an array of columns (interconnected by conductive lines that are hereinafter referred to as bitlines) and rows (interconnected by conductive lines that are hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

When data is written to a memory cell of the memory component for storage, the memory cell can deteriorate. Accordingly, each memory cell of the memory component can handle a finite number of write operations performed before the memory cell is no longer able to reliably store data. Data stored at the memory cells of the memory component can be read from the memory component and transmitted to a host system. When data is read from a memory cell of the memory component, nearby or adjacent memory cells can experience what is known as read disturb. Read disturb can be the result of continually reading from one memory cell without intervening erase operations, causing other nearby memory cells to change over time (e.g., become programmed). If too many read operations are performed on a memory cell, data stored at adjacent memory cells of the memory component can become corrupted or incorrectly stored at the memory cell. The corruption or incorrect storage can result in a higher error rate of the data stored at the memory cell. Thus, read disturb can increase the use of an error detection and correction operation (e.g., an error control operation) for subsequent operations (e.g., read and/or write) performed on the memory cell. The increased use of the error control operation can result in a reduction of the performance of a conventional memory sub-system. In addition, as the error rate for a memory cell or block continues to increase, it may even surpass the error correction capabilities of the memory sub-system, leading to an irreparable loss of the data. Furthermore, as more resources of the memory sub-system are used to perform the error control operation, fewer resources are available to perform other read operations or write operations.

However, as previously discussed, read disturb can affect memory cells that are adjacent to the memory cell that a read operation is performed on. Therefore, read disturb can induce a non-uniform stress on memory cells of the block if particular memory cells are read from more frequently. For example, memory cells of a block that are adjacent to a memory cell that is frequently read from can have a high error rate, while memory cells that are not adjacent to the memory cell can have a lower error rate due to a reduced impact by read disturb on these memory cells. The aforementioned read disturb can occur within a relatively short time after reading data from a block and is referred to herein as "fast read disturb." The term "fast" is used herein to indicate that the read disturb occurs within a relatively short time after a read, and thus for relatively small read-to-read delays. The relatively short time can be, e.g., less than a predefined threshold (e.g., 100 milliseconds).

Additionally, read disturb can linger on a block after the read command is completed. This lingering read disturb is referred to herein as "latent read disturb." Latent read disturb is caused by a lingering voltage on a memory cell left after a read operation. The term "latent" is used herein to indicate that latent read disturb occurs a relatively longer time after a read, e.g., for relatively longer read-to-read delay than fast read disturb. The longer time can be, e.g., greater than 1 second. A component of latent read disturb on a block can decrease over time. The lingering voltage can decrease over time, but may cause read disturb stress until the voltage dissipates. If read commands are issued in quick succession, for example, the latent read disturb stress component is reduced, and thus only a small amount of latent read disturb accumulates. If read commands are issued with delay in between a first read command and a second read command, the latent read disturb stress component per read is increased, and thus a comparatively larger amount of latent read disturb accumulates. Accordingly, less latent read disturb stress may be experienced by memory cells of the block when a delay between read commands is small.

A memory sub-system can mitigate the effects of read disturb by performing media management operations. To mitigate the effects of fast read disturb (FRD), the memory sub-system can maintain a read counter for each block (or other unit, such as each superblock or logical unit). If the read counter of a block exceeds a threshold read count, the memory sub-system can perform a data integrity check on the block. The data integrity check can measure data state metrics for the block. "Data state metric" herein shall refer to a quantity that is measured or inferred from the state of data stored on a memory device. Specifically, the data state metrics can reflect the state of the temporal voltage shift, the degree of read disturb, and/or other measurable functions of the data state. The data state metrics can include a read window budget (RWB) between voltage distributions of the memory cells of the specified block. RWB is a metric reflecting the difference between adjacent threshold voltage distributions and/or the reliability of the memory cell. RWB can be used as a measurement of the amount of degradation caused by read disturb. Memory cells having a low RWB may have a lower reliability when compared to other memory cells.

If the data integrity check determines that the RWB for a data block is below a threshold RWB value, then the data stored at the data block can be relocated to a new data block of the memory sub-system (also referred to as "folding" hereafter). The folding of the data stored at the data block to the other data block can include writing the data stored at the data block to the other data block to refresh the data stored by the memory sub-system. This folding can be done to negate fast read disturb associated with the data and erase the data at the data block. However, the same threshold read count is used for each data block, even though different blocks may have different levels of RWB loss. For example, different blocks read at different times may have different amounts of RWB loss but the same read counts. Since the blocks having greater RWB budget loss are not necessarily distinguishable from blocks having less RWB budget loss using the read count, and the firmware does not keep track of which pages have been affected by read disturb, the read count threshold is a worst-case read count threshold that corresponds to a worst-case stress on a page (e.g., a particular page is read significantly more often than the rest of the data in the same block). Using the worst-case read count threshold can result in scan operations being performed sooner than necessary, since some blocks are likely to have less RWB budget loss than the worst case scenario. Performing scan operations sooner than or more often than necessary can reduce system performance because each scan operation uses system resources and can delay other memory operations.

To mitigate the effects of latent read disturb (LRD), the memory sub-system can perform a scan at periodic time intervals, e.g., every three hours. At each time interval, the media management scan can determine an error-related data state metric such as a bit error count (BEC) for one or more blocks. The blocks can include, for example, each data block in the memory sub-system. Another example of an error-related data state metric is residual bit error rate (RBER). The RBER corresponds to a number of bit errors per unit of time that the data stored at the data block experiences (e.g., BEC/total bits read). If the error-related data state metric of a particular block satisfies a threshold criterion (e.g., BEC or RBER is above a threshold value), indicating a high error rate associated with data stored at the block, then the memory sub-system can perform a data integrity check on the particular block. The data integrity check can measure a read-disturb-related data state metric of the block, such as RWB or other data state metric that reflects the degree of read disturb of the block.

If the read-disturb-related data state metric satisfies a threshold criterion (e.g., RWB is below a threshold value), indicating a small RWB at the block due, then the block can be refreshed by performing a media management operation (e.g., a folding operation) to relocate the data stored at the block to a new block of the memory sub-system. However, performing a periodic scan can be inefficient. The criteria for performing the scan, an amount of elapsed time, does not take into account the timing or number of read operations performed on particular blocks. Thus, the scan can be initiated at times that are too soon for a block (e.g., because the amount of RWB at the block is high) or too late (e.g., because the amount of RWB at the block is low). To avoid initiating scans at times after substantial degradation of the RWB of a block has occurred, the time period between scans can be set to a worst-case value. As such, certain blocks are likely to be scanned too frequently. Thus, the error-related data state metric and/or the read-disturb-related data state metric is likely to be measured one or more times prior to the amount of degradation being sufficient to satisfy the criteria for a refresh operation. Performing scan operations sooner than or more often than necessary can reduce system performance because each scan operation uses system resources and can delay other memory operations.

Aspects of the present disclosure address the above and other deficiencies by maintaining a read counter for each memory block in a memory sub-system and, for each read operation performed on a memory block, incrementing the read counter of the memory block by an increment value that is based on a comparison between a read-to-read (R2R) delay of the memory block and a threshold delay value. The R2R delay can be an amount of time that has elapsed since a previous read operation on the same memory block. In some embodiments, if the R2R delay is less than the threshold delay value, the read counter can be incremented by a relatively small increment value that corresponds to a relatively small amount of read disturb degradation (e.g., read window budget (RWB) loss). Further, if the R2R delay is greater than or equal to the threshold delay value, the read counter can be incremented by a larger increment value that corresponds to a relatively large amount of read disturb degradation. The memory sub-system can perform a data integrity scan to refresh (e.g., rewrite) the memory block in response to the read counter exceeding a threshold counter value.

The increment value can be determined for any R2R delay value in a range of R2R delays that includes relatively low delay values in a fast read disturb regime and relatively high delay values in a latent read disturb regime. The threshold delay value can represent a boundary between the fast read disturb regime and the latent read disturb regime, and can be used to determine whether to increment the read counter by a relatively lower increment value that corresponds to the fast read disturb regime or a relatively higher value that corresponds to the latent read disturb regime. Thus, the increment value can be determined so that it is proportional to the amount of read disturb degradation (e.g., RWB loss) that the memory block has experienced since being refreshed. The increment value can be based on an amount of RWB loss that is expected to have occurred in cells of the memory block at a particular time according to a mapping between R2R delay times and RWB loss. The mapping can be determined by sampling the amount of RWB loss at cells of the memory device or a similar memory device over a range of times from the fast read disturb regime (e.g., less than 100 milliseconds) to the latent read disturb regime (e.g., greater than 1 second). For example, a first RWB loss value can be sampled at a first R2R delay that corresponds to the fast read disturb regime, and a second RWB loss value can be sampled at a second R2R delay that corresponds to the latent read disturb regime. A line or curve fitting technique can be determined using the sampled delay times and RWB losses as data points, and the resulting line or curve can represent the mapping.

The threshold delay value can be determined using the mapping between R2R delay times and RWB loss by identifying a midpoint RWB loss value between the first and second RWB loss values can then be determined, and mapped back to an R2R delay value. The resulting R2R delay value can be used as the threshold delay value. In some embodiments, multiple threshold delay values can be used to establish more fine-grained delay ranges and corresponding read increment values.

Advantages of the present disclosure include, but are not limited to, reducing the number of excessive media management scan operations performed by the memory sub-system to mitigate read disturb. The number of scan operations performed is reduced by using scan criteria that more accurately reflect the amount of degradation of the memory blocks, thereby reducing the number of excessive scan operations performed by the memory sub-system. The number of scan operations performed is reduced by incrementing a block read counter by an amount based on whether the read-to-read delay at the block is less than a first threshold delay value that corresponds to a fast read disturb regime of the memory device. The scan criteria more accurately reflect the amount of degradation of the memory blocks because the scan criteria is based on a read counter that is updated based an amount of read window budget (RWB). The amount of RWB characterizes the memory device for the read disturb regime that corresponds to the particular read-to-read delay at each read operation on a memory block.

Since the number of scan operations is reduced, the amount of resources of the memory sub-system devoted to performing the scan operations is also reduced. This reduction can result in an improvement of performance of the memory sub-system and a decrease in power consumption by the memory sub-system. Thus, a significant amount of memory sub-system resources can be made available for other operations. This availability of memory system resources for uses other than the media management scans results in a decrease in overall memory sub-system latency and an increase in overall memory sub-system efficiency.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a media management component 113 that can be used to alleviate read disturb in both a fast read disturb regime and a latent read disturb regime. The fast read disturb regime can include read disturb that occurs within a relatively short time after a read, and thus for relatively small read-to-read delays. The relatively short time can be, e.g., less than 100 milliseconds. The latent read disturb regime can include read disturb that occurs a relatively longer time after a read, e.g., for relatively longer read-to-read delay than fast read disturb. The longer time can be, e.g., greater than 1 second.

In an embodiment, the media management component 113 can perform a media management scan on a particular memory block in response to determining that a read count of the memory block exceeds a threshold counter value. The media management component 113 can increase the read count of the memory block by an increment value that is based on a read-to-read (R2R) delay determined for the memory block. The R2R delay can be an amount of time that has elapsed since a previous read operation on the same memory block. The increment value can be proportional to the R2R delay, since longer R2R delays can result in greater amounts of degradation (e.g., RWB loss) from read disturb effects. For each read operation, the media management component 113 can compare the R2R delay to one or more threshold counter values to determine the increment value. The threshold counter values and respective increment values can be specified by a data structure such as a lookup table. For example, a lookup table can include a set of rows, each of which associates a threshold delay value with a corresponding increment value. Each row can thus establish an association between a range of counter values bounded by the row's threshold counter value and a respective increment value. In one example, the lookup table can include a first row specifying a threshold delay value and a first increment value (e.g., 1) by which a block's read counter is to be incremented if the block's R2R delay is less than the threshold delay value. The lookup table can also specify a second row specifying the threshold delay value and a second increment value (e.g., 2) by which a block's read counter is to be incremented if the block's R2R delay is greater than or equal to the threshold delay value. The media management component 113 can, in response to each request to read data from a block, determine a R2R delay for the block based on a difference between a current time and a time at which the block was previously read. The media management component 113 can then use the lookup table to identify an increment value by finding a lookup table row that corresponds to the R2R delay, and increment the block's read counter by the identified increment value. The memory sub-system can determine whether the block's read counter exceeds a threshold value, and perform a media management scan (e.g., a data integrity scan) to refresh (e.g., rewrite) the memory block if the read counter exceeds the threshold counter value. Further details relating to the operations of the media management component 113 are described below.

Figure 2:
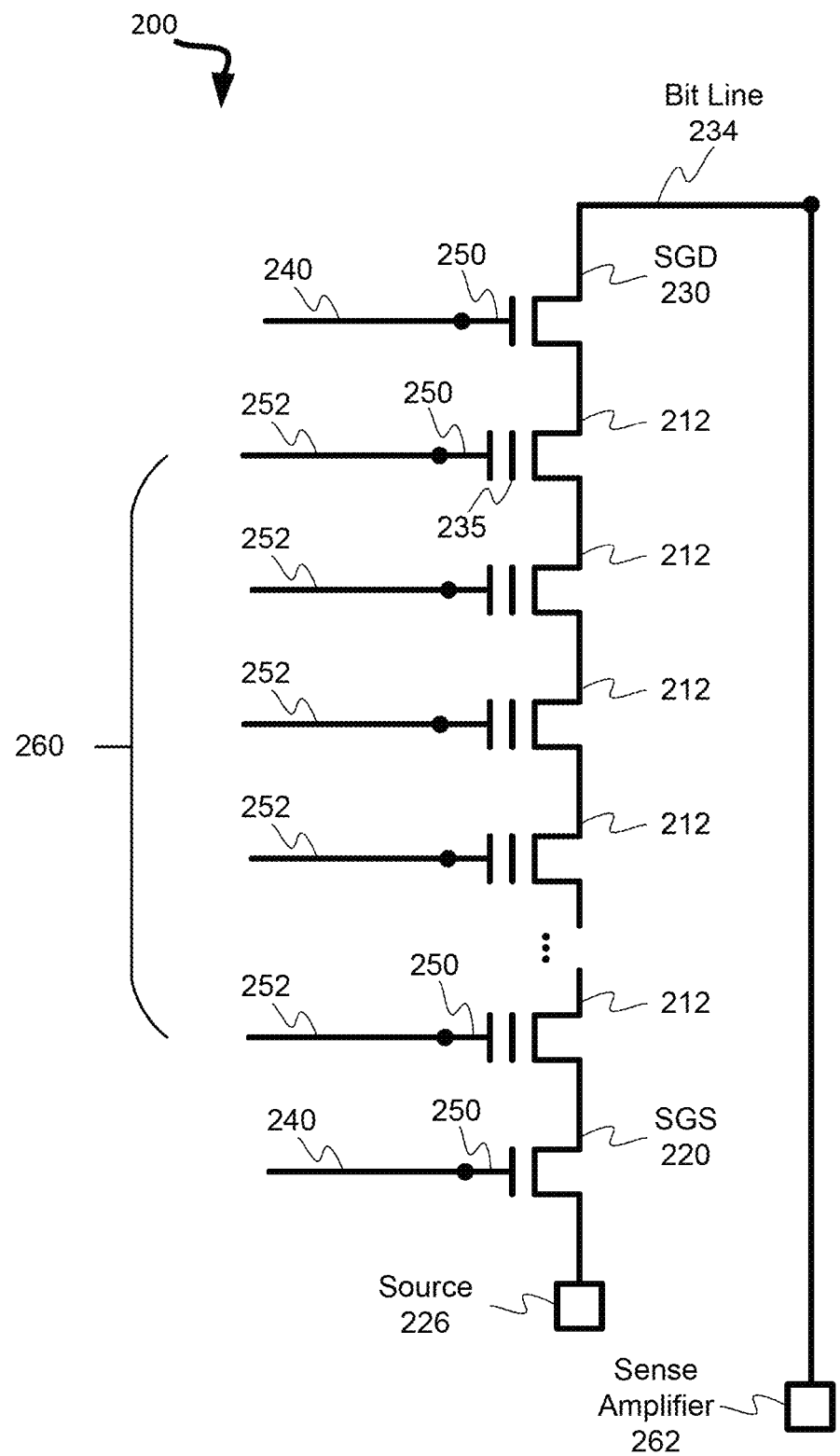
FIG. 2 is a schematic diagram illustrating an example string of memory cells in a data block of a memory device in a memory sub-system in accordance with some embodiments of the present disclosure.

FIG. 2 is a schematic diagram illustrating a string 200 of memory cells in a data block of a memory device in a memory sub-system in accordance with some embodiments of the present disclosure. In one embodiment, the string 200 is representative of one portion of memory device 130, such as from an array of memory cells 104, as shown in FIG. 1A. The string 200 includes a number of memory cells 212 (i.e., charge storage devices), such as up to 32 memory cells (or more) in some embodiments. The string 200 includes a source-side select transistor known as a select gate source 220 (SGS) (typically an n-channel transistor) coupled between a memory cell 212 at one end of the string 200 and a common source 226. The common source 226 may include, for example, a commonly doped semiconductor material and/or other conductive material. At the other end of the string 200, a drain-side select transistor called a select gate drain 230 (SGD) (typically an n-channel transistor) is coupled between one of the memory cells 212 and a data line that is referred to as a bitline 234. The string 200 thus corresponds to a bitline 234. The common source 226 can be coupled to a reference voltage (e.g., ground voltage or simply "ground" [GND]) or a voltage source (e.g., a charge pump circuit or power supply which may be selectively configured to a particular voltage suitable for optimizing a programming operation, for example).

Each memory cell 212 may include, for example, a floating gate transistor or a charge trap transistor and may comprise a single level memory cell or a multilevel memory cell. The floating gate may be referred to as a charge storage structure 235. The memory cells 212, the SGS 220, and the SGD 230 can be controlled by signals on their respective control gates 250.

Control signals can be applied to select lines 240, to select strings 200, or to access lines (e.g., wordlines 252) to select memory cells 212, for example. In some cases, the control gates can form a portion of the select lines 240 (for select gates 220, 230) or access lines (for cells 212). The drain select gate 230 receives a voltage that can cause the drain select gate 230 to select or deselect the string 200. In one embodiment, each respective control gate 250 is connected to a separate wordline 252 (i.e., access line), such that each device or memory cell can be separately controlled. The string 200 can be one of multiple strings of memory cells in a block of memory cells in memory device 130. For example, when multiple strings of memory cells are present, each memory cell 212 in string 200 may be connected to a corresponding shared wordline 252, to which a corresponding memory cell of each of the multiple strings is also connected. As such, if a selected memory cell 212 in one of those multiple strings is being read, a corresponding unselected memory cell 212 in string 200 which is connected to the same wordline 252 as the selected cell can be subjected to the same read voltage, potentially leading to read disturb effects on the unselected memory cell 212.

Fast read disturb can occur within a relatively short time after a read operation is performed on a cell 212 of a string 200, e.g., within approximately 100 milliseconds after the read operation. Fast read disturb can result in threshold voltage shift on cells 212 in the string 200, and particularly on cells that are not being read ("unread cells"). During a read operation of a read cell 212, a read reference voltage ($V_{ref}$) can be applied to an associated wordline 252, and a sense amplifier 262 connected to an associated bitline 234 can be used to sense whether the read cell 212 has been switched on. More specifically, if $V_{ref}$ is higher than a threshold voltage (Vt) of the read cell 212, then the read cell 212 is determined to be on. It is noted that only one cell 212 per bitline 234 can be read at a time. Since the cells of a bitline 234 are connected in series, all transistors for cells 212 of the bitline 234 that are not being read ("unread cells") need to be kept on during the read operation in order for the read output of the read cell to pass-through to the sense amplifier 262. To achieve this pass-through, a pass-through voltage ($V_{pass}$) can be applied to the wordlines 252 of the unread cells to keep the unread cells activated (i.e., turned on). More specifically, $V_{pass}$ is a voltage that is chosen to be higher than all of the Vt's of the unread cells, but lower than a programming voltage. Although $V_{pass}$ is a lower voltage than the programming voltage, the application of $V_{pass}$ can affect (e.g., increase) the Vt's and thus alter logic states of the unread cells of the block via tunneling currents. This phenomenon is referred to herein as "fast read disturb." As more read operations are applied within the block, the accumulation of read disturb over time leads to read disturb errors. For example, if a particular wordline 252 ("WLn") is read numerous times, the accumulation of read disturb can cause threshold voltage shift and corresponding degradation of the read window budget of other cells on the same bitline 234 as the wordline 252. This read disturb effect can be particularly severe on adjacent wordlines (e.g., WLn−1 and WLn+1) because a higher pass-through voltage can be applied to adjacent wordlines to account for capacitive coupling effects on the adjacent wordlines resulting from the read operation.

Figure 3:
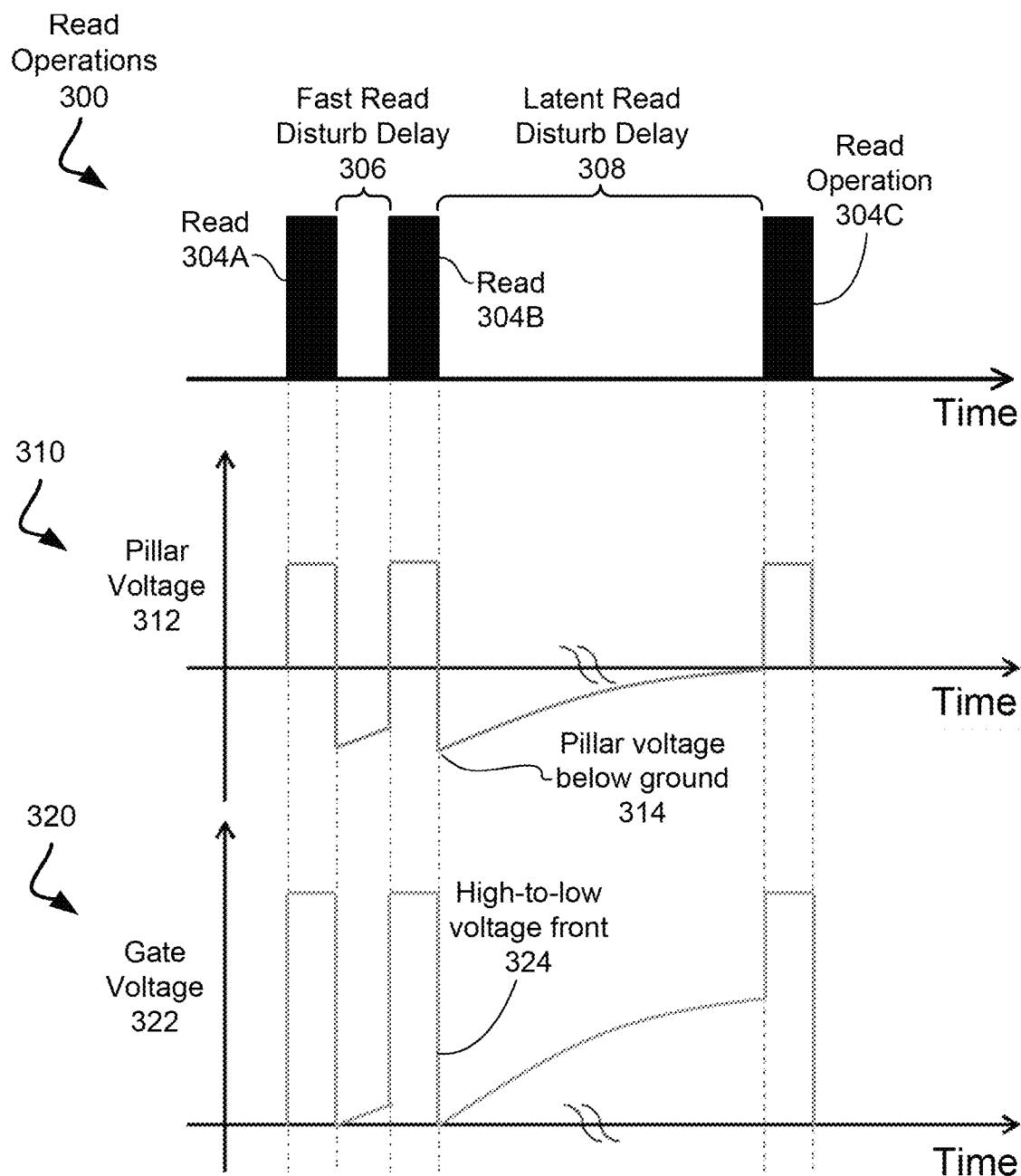
FIG. 3 illustrates examples of fast read disturb and latent read disturb effects over time in accordance with some embodiments.

FIG. 3 illustrates examples of fast read disturb and latent read disturb effects over time in accordance with some embodiments. An example read operations timeline 300 illustrates three successive read operations 304A, 304B, 304C that read data from one or more memory cells. The reads 304 can cause fast read disturb, which can occur within a relatively short time 306 after a read, and latent read disturb, which can occur during a longer time 308 after a read. Each read operation 304 occurs at a respective time during operation of a memory sub-system. Read 304B occurs after read 304A and is separated from read 304A by an R2R delay shown as a fast read disturb delay 306. The fast read disturb delay 306 can be, for example, less than approximately 100 milliseconds. Read 304C occurs after read 304B and is separated from read 304B by an R2R delay shown as a latent read disturb delay 308. The latent read disturb delay 308 can be for example, more than approximately one second.

An example pillar voltage graph 310 illustrates an amount of pillar voltage 312 at a "pillar" (i.e., channel) of memory cells 212 of a string 200. The pillar voltage 312 reaches a peak value when each read 304 occurs, becomes negative after each read 304, and discharges back to a ground voltage over time between reads 304, as described below. An example gate voltage graph 320 illustrates an amount of gate voltage 322 at a gate 212. The gate voltage 322 reaches a peak (e.g., $V_{ref}$ or $V_{pass}$) during each read 304, and increases over time between reads 304 as a result of capacitive coupling with the pillar voltage 312, as described below.

After a read 304 is finished, the wordlines 252 are ramped down to a low voltage, as shown by a high-to-low voltage front 324. The wordlines 252 then correspond to a floating set 260 of wordlines. A residual electrical field can remain between the gate and the pillar of each of the cells 212 within the floating set 260 of wordlines. The residual electric field can result in latent read disturb, which can cause threshold voltage shift and thus RWB loss on the cells 212 within the floating set 260 of wordlines. The residual electrical field can be caused by capacitive coupling of the pillar potential with the wordlines 252 during wordline ramping down, and sustained by a blockage of the electron discharge path. The capacitive coupling is caused by the high-to-low voltage front 324 on each control gate 250. The high-to-low voltage front results from the ramping-down of the wordline 252 connected to the gate 250. The high-to-low voltage front 324 on the gate 250, and the capacitive coupling with the pillar, cause the voltage of the pillar to reach a value below ground (e.g., at point 314). The pillar voltage then increases toward ground because the source 226 and bit line 234 are at the ground voltage. Since the gate 212 is capacitively coupled to the pillar and is in a floating condition, the voltage of the gate 212 slowly increases as the pillar voltage increases until another read operation occurs (at which time the gate can be set to $V_{ref}$ or $V_{pass}$) or a substantial amount of time passes (at which time the gate voltage can reach the ground voltage as a result of slow discharge). Although the voltage on the cell in the latent read disturb regime is lower than in the fast read disturb regime (e.g., lower than $V_{pass}$), the voltage in the latent read disturb regime lingers for a relatively long time, e.g., a number of seconds or hours). The voltage discharges slowly in the latent read disturb regime because, for example, each gate is connected to a transistor having a high on-off ratio. Because of the extended time duration of the latent read disturb regime, the stress from latent read disturb can cause threshold voltage shift and thus RWB loss in the cells 212.

Figure 4:
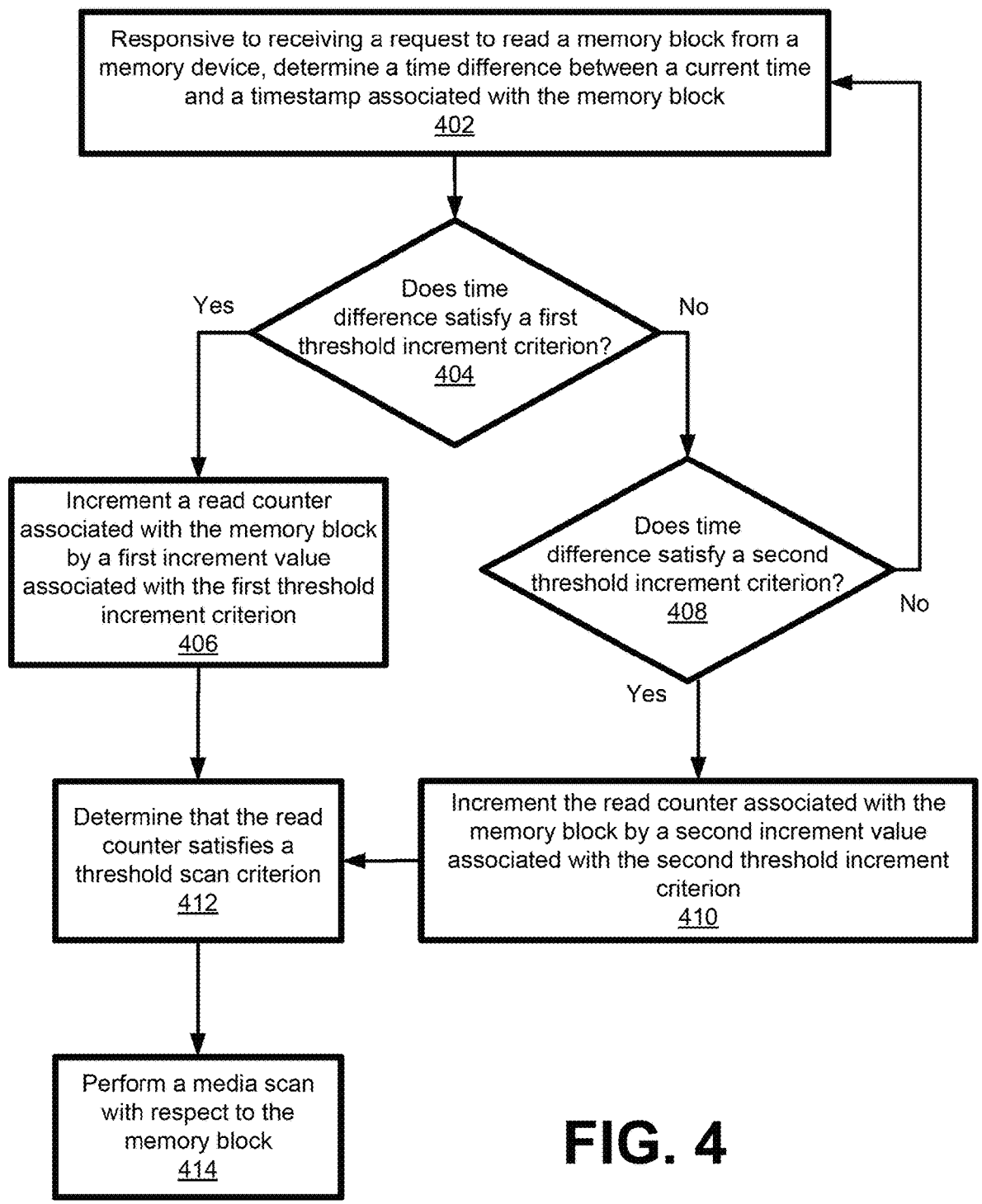
FIG. 4 is a flow diagram of an example method to perform a media scan that can mitigate read disturb in both fast and latent regimes using a read counter incremented by an amount that corresponds to the read disturb regime in accordance with some embodiments.

FIG. 4 is a flow diagram of an example method 400 to perform a media scan that can mitigate read disturb in both fast and latent regimes using a read counter incremented by an amount that corresponds to the read disturb regime in accordance with some embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the media management component 113 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic can, responsive to receiving a request to read a memory block from a memory device, determine a time difference between a current time and a timestamp associated with the memory block. At operation 404, the processing logic can determine whether the time difference satisfies a first threshold increment criterion. If the time difference satisfies the first threshold increment condition, then at operation 406, the processing logic can increment a read counter associated with the memory block by a first increment value associated with the first threshold increment criterion. The first and second increment values can be determined as described below with reference to FIGS. 6 and 7A, for example. In one example, if the time difference satisfies the first threshold increment condition if the time difference is in the fast RD regime, then the first increment value can be 1, as described below with respect to FIG. 6. The processing logic can then perform operation 412.

If at operation 404 the processing logic determines that the time difference does not satisfy the first threshold increment criterion, then at operation 408 the processing logic can determine whether the time difference satisfies a second threshold increment criterion. If the time difference satisfies the second threshold increment criterion, then the processing logic can perform operation 410. In one example, if the time difference satisfies the second threshold increment condition if the time difference is in the latent RD regime, then the second increment value can be 3, as described below with respect to FIG. 6. If the time difference does not satisfy the second threshold increment criterion, then the processing logic can perform operation 402.

At operation 410, the processing logic can increment the read counter associated with the memory block by a second increment value associated with the second threshold increment criterion. At operation 412, the processing logic can determine that the read counter satisfies a threshold scan criterion. At operation 414, the processing logic can perform a media scan with respect to the memory block. Although two thresholds are used in the description of the example method 400, more than two thresholds, can be used to establish more fine-grained delay ranges and corresponding read increment values, thereby enabling more read increment values to be used. A larger number of read increment values can more accurately reflect the amount of RWB wear caused for particular read-to-read time ranges.

Figure 5:
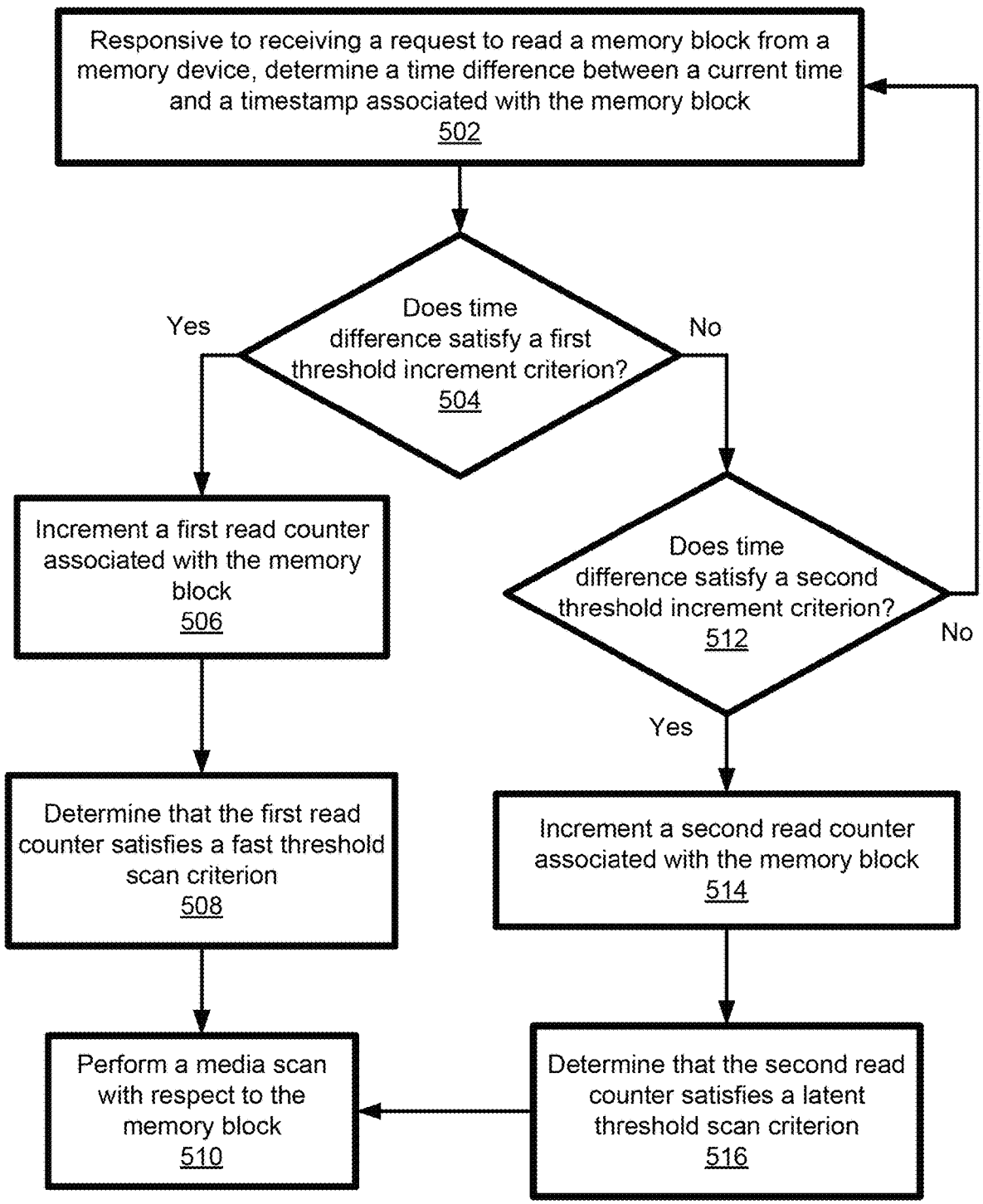
FIG. 5 is a flow diagram of an example method to perform a media scan that can mitigate read disturb in both fast and latent regimes using a different read counter for each read disturb regime in accordance with some embodiments.

FIG. 5 is a flow diagram of an example method 50 to perform a media scan that can mitigate read disturb in both fast and latent regimes using a different read counter for each read disturb regime in accordance with some embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the media management component 113 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic can, responsive to receiving a request to read a memory block from a memory device, determine a time difference between a current time and a timestamp associated with the memory block. At operation 504, the processing logic can determine whether the time difference satisfies a first threshold increment criterion. If the time difference satisfies the first threshold increment condition, then at operation 506, the processing logic can increment a read counter associated with the memory block by a first increment value associated with the first threshold increment criterion. At operation 508, the processing logic can determine that the first read counter satisfies a fast threshold scan criterion. At operation 510, the processing logic can perform a media scan with respect to the memory block.

If at operation 504 the processing logic determines that the time difference does not satisfy the first threshold increment criterion, then at operation 512 the processing logic can determine whether the time difference satisfies a second threshold increment criterion. If the time difference satisfies the second threshold increment criterion, then the processing logic can perform operation 514. If the time difference does not satisfy the second threshold increment criterion, then the processing logic can perform operation 502. At operation 514, the processing logic can increment a second read counter associated with the memory block. At operation 516, the processing logic can determine that the second read counter satisfies a latent threshold scan criterion. The processing logic can then perform operation 510, at which the processing logic can perform a media scan with respect to the memory block.

Figure 6:
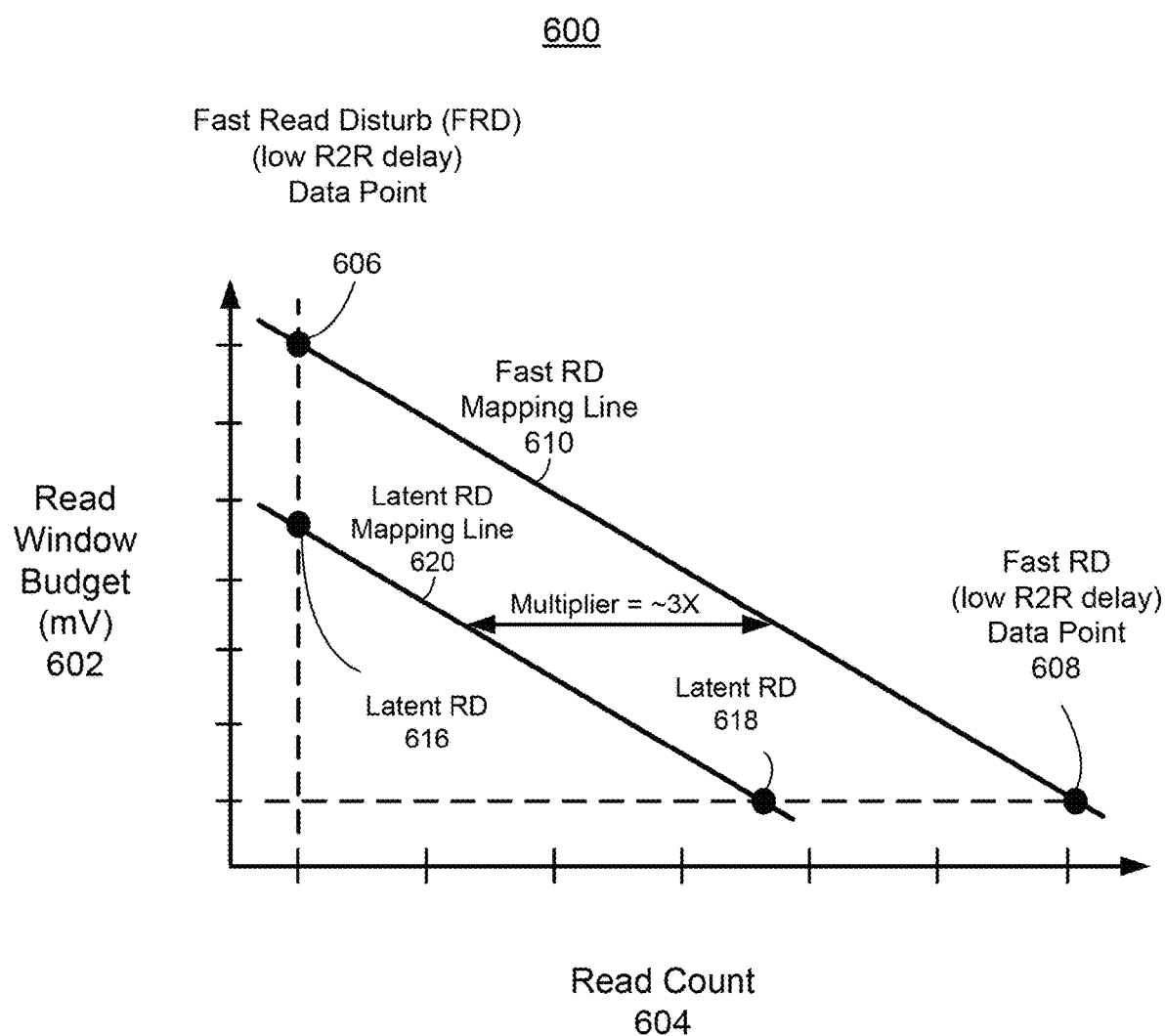
FIG. 6 illustrates an example graph of example mappings between read window budget and read count for a memory device in accordance with some embodiments.

FIG. 6 illustrates a graph 600 of example mappings between read window budget (RWB) and read count for a memory device in accordance with some embodiments. The x-axis of the graph 600 represents a range of read counts from 250 reads to 4000 reads (shown on a scale with logarithmic spacing). The graph 600 shows two mapping lines 610, 620, each of which represents a mapping between read count values 604 and read window budget 602 measured at a particular read-to-read delay. The fast read disturb (RD) mapping line 610 can be generated by measuring RWB values 602 after two or more sequences of reads, with a particular delay between the reads in the sequences. For the fast RD mapping line 610, the delay can be a read-to-read time that is in a fast RD regime. Each sequence of reads can be performed for a particular read count 604 (shown on the x-axis). The measured RWB values 602 are shown on the y-axis.

To determine the fast RD mapping line 610, a first fast RD data point 606 can be determined as follows. A first sequence of 250 reads can be performed on a cell using a read-to-read delay RR1 in the fast RD regime, and then the RWB of the cell can be measured. In this example, the measured RWB value produces the data point 606 having a corresponding read count and a corresponding RWB value. A second fast RD data point 608 can be determined by performing a second sequence of a different number of reads on a cell using the read-to-read delay RR1 in the fast RD regime. The RWB of the cell can then be measured. The measurement produces a data point 608 having a corresponding read count and a corresponding RWB value. The fast RD mapping line 610 can then be determined by fitting a line to the points 606, 608. In this example, the fast RD mapping line 610 passes through the points 606, 608.

To determine the latent RD mapping line 620, a first latent RD data point 616 can be determined as follows. A first sequence of 250 reads can be performed on a cell using a read-to-read delay RR2 in the latent RD regime, and then the RWB of the cell can be measured. The measurement produces the data point 616 having a corresponding read count and a corresponding RWB value. A second latent RD data point 618 can be determined by performing a second sequence of a different number of reads on a cell using the read-to-read delay RR2 in the latent RD regime. The RWB of the cell can then be measured. The measurement produces a data point 608 having a corresponding read count and a corresponding RWB value. The latent RD mapping line 620 can then be determined by fitting a line to the points 616, 618. In this example, the latent RD mapping line 620 passes through the points 616, 618.

The mapping lines 610, 620 can be used to identify a relation between latent RD regime read counts and fast RD read counts. In the example of FIG. 6, fast RD read count values on the mapping line 610 representing the fast read disturb regime are approximately three times (3X) greater than the latent RD read count values on the mapping line 620 representing the latent read disturb regime for the same read window budget. For example, the fast RD data point 608 on the line 610 has a corresponding read count value (x-coordinate) and a corresponding RWB value (y-coordinate). The latent RD data point 618, which has the same RWB value as the data point 608, has a different read count value (x-coordinate). Thus, the number of reads in the latent RD regime correspond to another number reads in the fast RD regime, which is a factor of N increase in the latent RD regime. A multiplier value of N can thus be used to convert fast RD read counts to latent RD read counts. Accordingly, for the memory cell used to measure the data points, N reads in the fast RD regime correspond to approximately the same amount of RWB as 1 read in the latent RD regime. Since RWB corresponds to an amount of wear (e.g., RWB loss) on the memory cell, N fast reads cause approximately the same amount of wear as 1 latent read.

Thus, for the read counter increment operations shown in FIGS. 4 and 5, the read counter can be incremented by a first increment value of 1 when the time difference between reads is in the fast RD regime, or by a second increment value of N when the time difference is in the latent RD regime. A time threshold can be used in the threshold increment criteria of FIGS. 4 and 5 to determine whether the time difference is in the fast RD regime or in the latent RD regime. For example, the time difference can be in the fast RD regime if the time difference satisfies the first threshold increment criterion. As another example, the time difference can be in the latent RD regime if the time difference satisfies the second threshold increment criterion. The time threshold can be determined using the read-to-read delay values RR1 and RR2 described above. For example, the time threshold can be a value between RR1 and RR2, such as a midpoint between RR1 and RR2. The first and second increment values and the RR1 and RR2 values can also be used to determine a lookup table such as the lookup table 900 of FIG. 9A. For example, in the lookup table 900, the value Th1 can be a midpoint between RR1 and RR2, The value Increment1 can be the first increment value, and Increment2 can be the second increment value.

Although the mapping line 610 is generated from two data points in this example, the mapping line can be generated from a greater number of data points in other examples, in which case the line can be fit to the data points, and the distance between lines can be different from the distance between points on the lines.

Figure 7A:
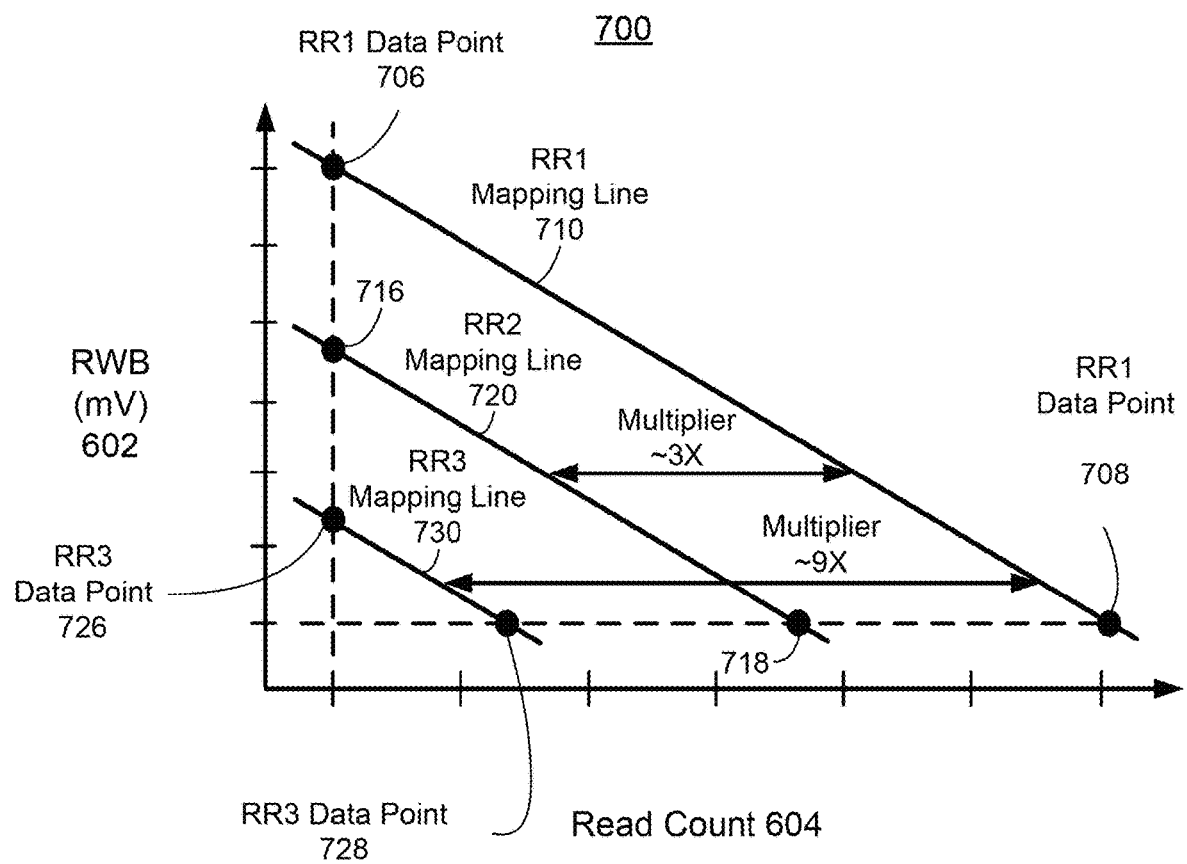
FIG. 7A illustrates an example graph of three example mappings between read window budget and read count for a memory device in accordance with some embodiments.

FIG. 7A illustrates an example graph 700 of three example mappings 710, 720, 730 between read window budget and read count for a memory device in accordance with some embodiments. The graph 700 of FIG. 7A is similar to the graph 600 of FIG. 6, but three mapping lines 710, 720, 730 are shown in FIG. 7A instead of the two mapping lines 610, 620 of FIG. 6. Accordingly, three multipliers (e.g., 1×, 3× and 9×) are determined from the graph 700, instead of two multipliers from the graph 600 (e.g., 1× and 3×). Three multipliers can be used to determine three different read counter increment values that can be used in three respective delay time ranges, thereby enabling the read counter increment values to more accurately reflect the amount of RWB wear caused for particular read-to-read time ranges.

The graph 700 shows three mapping lines RR1 710, RR2 720, RR3 730, each of which represents a mapping between read count values 604 and read window budget 602 measured at a particular read-to-read delay. A Read-Read Delay 1 (RR1) mapping line 710 can be generated by measuring RWB values 602 after two or more sequences of reads, with a particular delay between the reads in the sequences. For the RR1 mapping line 710, the delay used for the measurements, RR1, can be a read-to-read time that is a predetermined fast RD regime delay, for example. For the RR2 mapping line 720, the delay used for the measurements, RR2, can be a read-to-read time that is between (e.g., at a midpoint or other location between) the predetermined fast RD regime delay and a predetermined latent RD regime delay, for example. For the RR3 mapping line 730, the delay used for the measurements, RR3, can be a read-to-read time that is the predetermined latent RD regime delay, for example. Each sequence of reads can be performed for a particular read count 604 (shown on the x-axis). The measured RWB values 602 are shown on the y-axis.

To determine the RR1 mapping line 710, a first RR1 data point 706 and a second RR1 data point 708 can be determined similarly to the data points 606 and 608 described above with respect to FIG. 6, using the read-to-read delay RR1 for the measurements of the two sequences of reads. The RR1 mapping line 710 can then be determined by fitting a line to the points 706, 708, resulting in the mapping line 710.

To determine the RR2 mapping line 720, a first RR2 data point 716 and a second RR2 data point 718 can be determined similarly to the data points 616 and 617 described above with respect to FIG. 6, using the read-to-read delay RR2 for the measurements of the two sequences of reads. The RR2 mapping line 720 can then be determined by fitting a line to the points 716, 718.

The RR3 mapping line 730 can be generated similarly to the RR2 mapping line 720. A first RR3 data point 726 (having a corresponding read count and a corresponding RWB value), and a second RR3 data point 728 (having a corresponding read count and a corresponding RWB value) can be determined similarly to the data points 616 and 617 described above with respect to FIG. 6, using the read-to-read delay RR3 for the measurements of the two sequences of reads. The RR3 mapping line 730 can then be determined by fitting a line to the points 726, 728.

The mapping lines 710, 720, 730 can be used to identify relations between read counts in the RR1 read disturb regime (e.g., fast RD), read counts in the RR2 regime (e.g., between fast RD and latent RD), and read counts in the RR3 regime (e.g., latent RD). In the example of FIG. 7A, the RR1 read count values shown on the mapping line 710 representing the RR1 regime are approximately K times greater than the RR2 read count values shown on the mapping line 720 representing the RR2 regime for the same read window budget. For example, the RR1 data point 708 shown on the mapping line 710 has a corresponding read count and a corresponding RWB value. The RR2 data point 718, which has the same RWB value as the data point 708, has a different read count value. Thus, a certain umber reads in the RR2 regime correspond to another number of reads in the RR1 regime, which is a factor of M increase in the RR2 regime relative to the RR1 regime. Accordingly, a multiplier value of M can be used to convert RR1 (e.g., fast RD) read counts to RR2 (e.g., between latent and fast RD) read counts.

Further, RR1 read count values shown on the mapping line 710 representing the RR1 regime (e.g., fast RD) are approximately M times greater than the RR3 read count values shown on the mapping line 730 representing the RR3 regime (e.g., latent RD) for the same read window budget. As described above, the RR1 data point 708 shown on the mapping line 710 has a corresponding read count and a corresponding RWB value. The RR3 data point 728, which has the same RWB value as the data point 708, has a different read count value. Thus, a certain number of reads in the RR3 regime correspond to a different number of reads in the RR1 regime, which is a factor of P increase in the RR3 regime relative to the RR1 regime. Accordingly, a multiplier value of P can be used to convert RR1 (e.g., fast RD) read counts to RR3 (e.g., latent RD) read counts.

Thus, for the memory cell used to measure the data points, P reads in the RR3 RD regime correspond to approximately the same amount of RWB as 1 read in the RR1 RD regime. Since RWB corresponds to an amount of wear (e.g., RWB loss) on the memory cell, 9 RR3 (e.g., fast) reads cause approximately the same amount of wear as 1 RR3 (e.g., latent) read, which is the same amount of wear as 3 RR2 (e.g., between fast and latent) reads.

Thus, for the read counter increment operations shown in FIGS. 4 and 5, the read counter can be incremented by a first increment value of 1 if the time difference between reads corresponds to the RR1 regime, by a second increment value of 3 if the time difference corresponds to the RR2 regime, or by a third increment value of 9 if the time difference corresponds to the RR3 regime. Two time thresholds Th1 and Th2 can be used in the threshold increment criteria of FIGS. 4 and 5 to determine whether the time difference corresponds to the RR1 regime (e.g., time difference less than Th1), the RR2 regime (e.g., time difference between Th1 and Th2), or the RR3 regime (e.g., time difference greater than Th2).

Figure 7B:
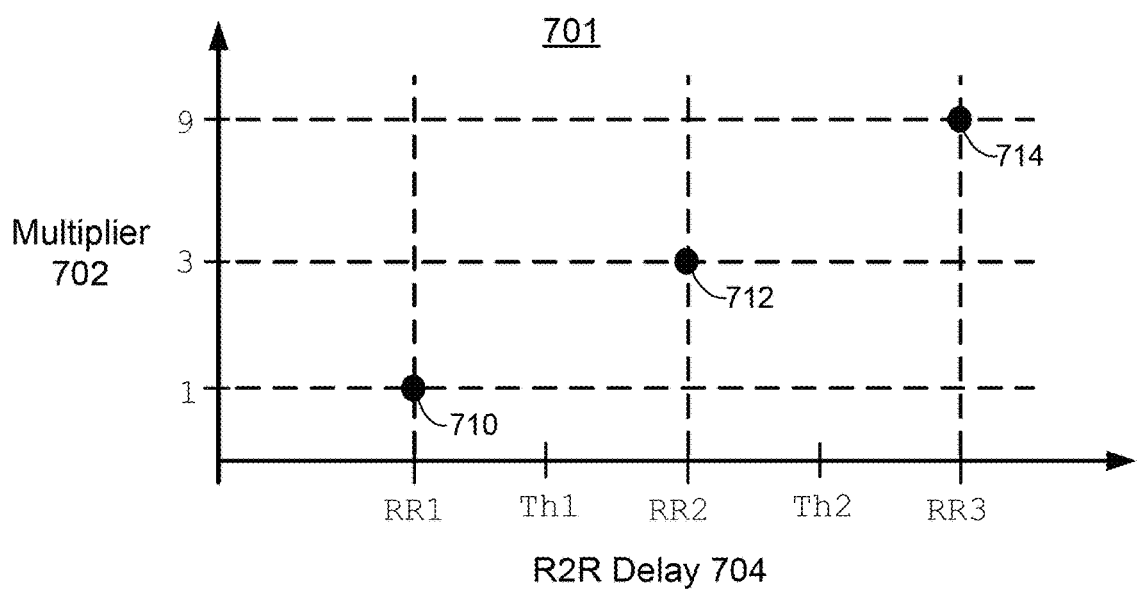
FIG. 7B illustrates an example graph of read count multipliers and respective read-to-read delays in accordance with some embodiments.

FIG. 7B illustrates an example graph 701 of read count multipliers 702 and respective read-to-read delays 704 in accordance with some embodiments. The x-axis of the graph 701, which represents R2R delay 704. The values RR1, RR2, and RR3 are shown on the x-axis. The values of the multipliers 702 are shown on the y-axis. A y-coordinate of a point 710 illustrates the multiplier value 1, which corresponds to the delay RR1. A y-coordinate of a point 712 illustrates the multiplier value 2, which corresponds to the delay RR2. A y-coordinate of a point 714 illustrates the multiplier value 9, which corresponds to the delay RR3.

The time thresholds can be determined using the read-to-read delay values RR1, RR2, and RR3. For example, as shown in graph 701 of FIG. 7B, the first time threshold Th1 can be a value between RR1 and RR2, such as a midpoint between of RR1 and RR2. Further, the second time threshold Th2 can be a value between RR2 and RR3, such as a midpoint between of RR2 and RR3.

The first, second, and third increment values, and the RR1, RR2, and RR3 values, can also be used to determine the values in a lookup table such as the lookup table 901 of FIG. 9B. For example, in the lookup table 901, Th1 can be based on a midpoint between RR1 and RR2, and Th2 can be based on a midpoint between RR2 and RR3. Increment) can be based on the first increment value (described above) for R2R delays less than Th1. Increment2 can be based on the second increment value for R2R delays between Th1 and Th2. Increment3 can be based on the third increment value for R2R delays greater than Th2. As can be seen by comparing FIG. 9A to FIG. 9B, using more threshold values and thus more read count increment values can increase the size of the lookup table. However, using more threshold values (and corresponding increment values) enables the lookup table to more accurately indicate the amount by which to increment the read counter for particular read-to-read delays.

Figure 8A:
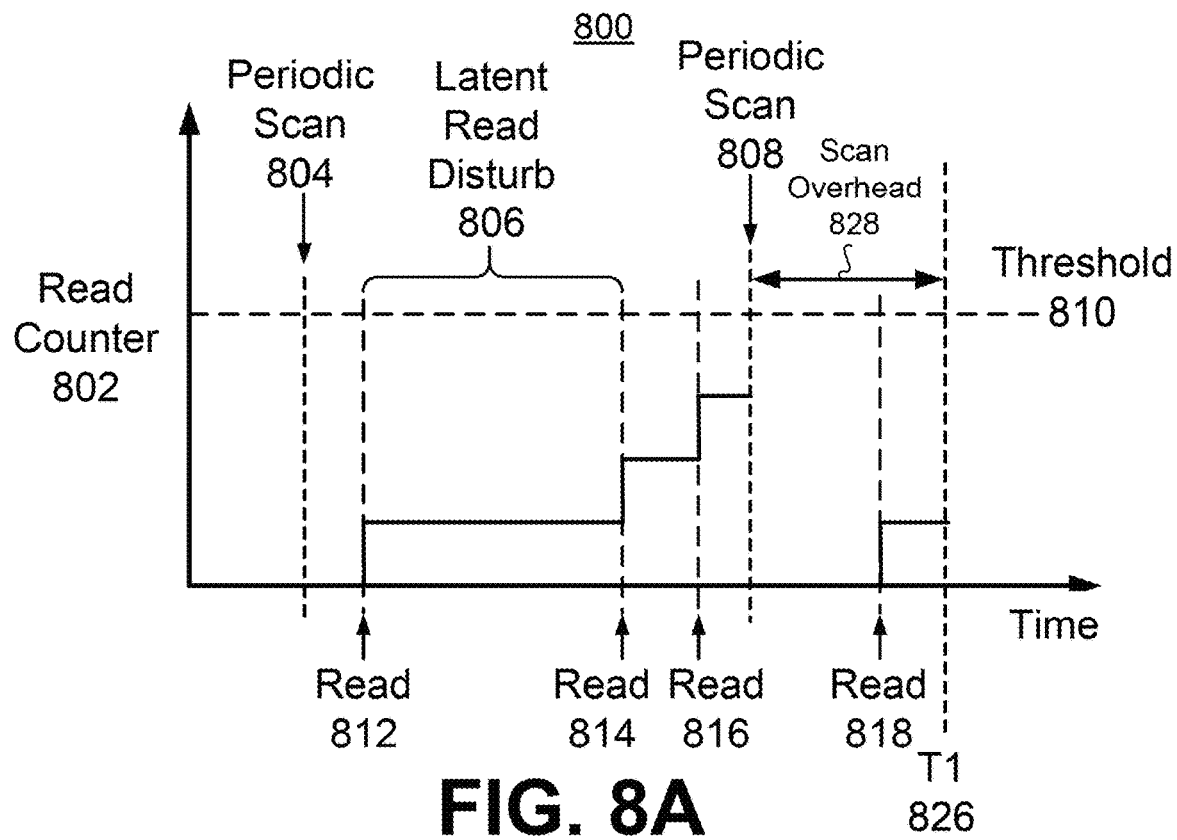
FIG. 8A illustrates an example graph of read counter values over time in an example of using a media scan to mitigate fast and latent read disturb in accordance with some embodiments.

FIG. 8A illustrates a graph 800 of read counter values over time in an example of using a media scan to mitigate fast and latent read disturb in accordance with some embodiments. An x-axis of the graph 800 represents time, and a y-axis of the graph 800 represents read counter values. A periodic media scan 804 of a block occurs and sets the block's read counter to zero. A first read 812 occurs, and the read counter is incremented to have a value of 1. A second read 814 occurs after an amount of time 806 that is sufficient for the block to enter the latent read disturb regime. A third read 816 occurs after a relatively short amount of time, and the counter is incremented to have a value of 2. A periodic scan 808 then occurs, which rewrites the block to a different memory location and resets the read counter. Another read 818 occurs subsequent to the periodic scan 808, and the read counter is again incremented to have a value of 1.

Figure 8B:
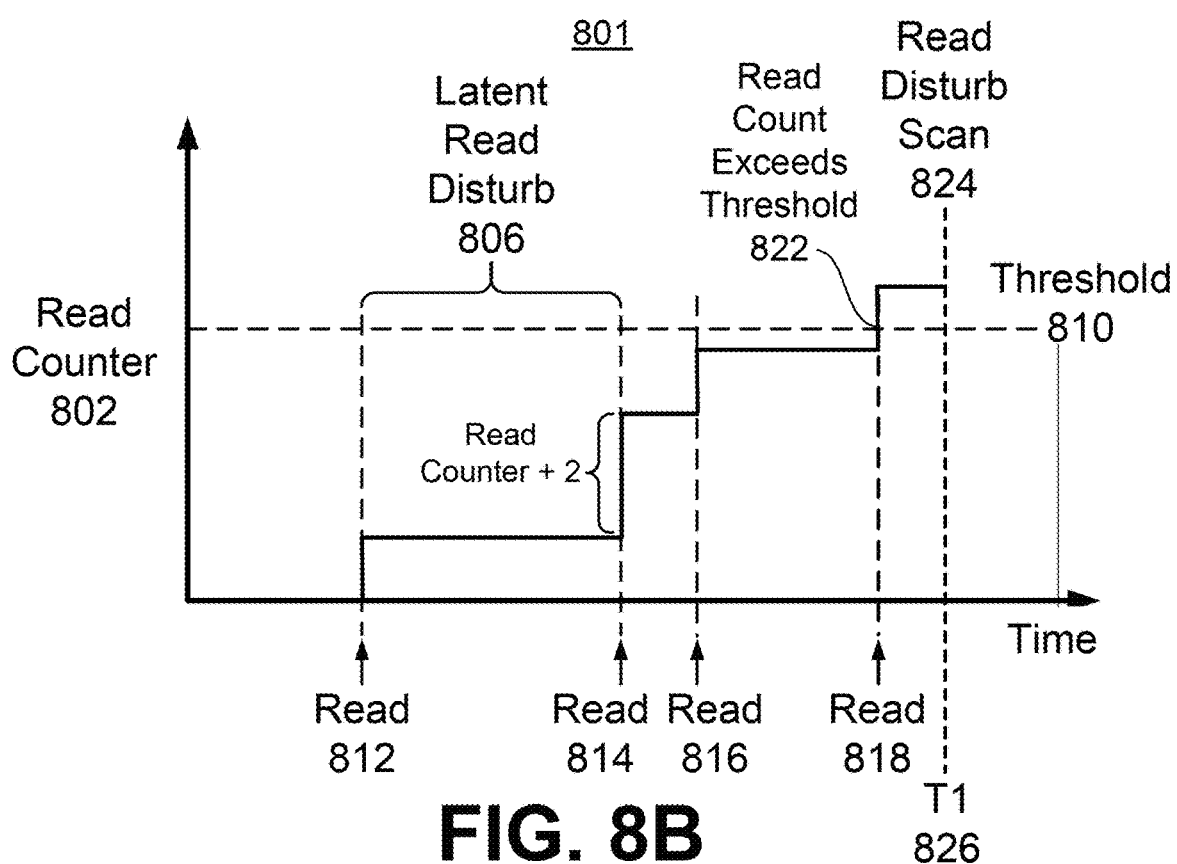
FIG. 8B illustrates an example graph of read counter values over time in an example of using a read disturb scan performed based on unified criteria to mitigate fast and latent read disturb in accordance with some embodiments.

FIG. 8B illustrates a graph 801 of read counter values over time in an example of using a read disturb scan performed based on unified criteria to mitigate fast and latent read disturb in accordance with some embodiments. A block's read counter is initially set to zero. A first read 812 occurs, and the read counter is incremented to have a value of 1. A second read 814 occurs after an amount of time 806 that is sufficient for the block to enter the latent read disturb regime. The media management component 113 detects that the R2R time between read 812 and read 814 is greater than a threshold delay value, and accordingly increments the block's read counter by 2 that corresponds to the latent read disturb regime.

A third read 816 then occurs after a relatively short amount of time, and the read counter is incremented to have a value of 3. A fourth read 816 occurs and increments the read counter to have a value of 4. The value 4 exceeds the threshold read counter value 810 (e.g., 3), so the threshold scan criteria is satisfied, and the read 818 causes a read disturb scan 824 to be performed on the block at time Ti. Comparing the graph 801, which uses the media management component 113 described herein, to the graph 800, it can be seen that the read disturb scan 824 in graph 801 began later than the periodic scan 808 (by an amount of time shown as scan overhead 828), thereby allowing more read operations to be performed in prior to the read disturb scan 824 in graph 801.

FIGS. 9A-9B illustrate example lookup tables that associate read-to-read delay ranges with respective read counter increment values in accordance with some embodiments. FIG. 9A shows a lookup table 900 that maps R2R delay ranges 902 to respective read count increments 904. The table 900 can be a data structure that includes one or more records. The table 900 includes a first record specifying a first delay range (e.g., 0 to Th1) and an associated first read counter increment value (e.g., 1), and a second record specifying a second delay range (e.g., greater than Th1) and an associated second read counter increment value (e.g., 2). The values in the table 900 can be determined as described above with respect to FIG. 6, for example.

FIG. 9B shows a lookup table 901 that maps R2R delay ranges 912 to respective read count increments 914. The table 901 can be a data structure that includes one or more records. The table 901 includes a first record specifying a first delay range (e.g., 0 to Th1) and an associated first read counter increment value (e.g., 1), a second record specifying a second delay range (e.g., between Th1 and Th2>Th1) and an associated second read counter increment value (e.g., 2.75), and a third mapping specifying a third delay range (e.g., between Th2 and a maximum numeric value) and an associated third increment value (e.g., 10). The values in the table 901 can be determined as described above with respect to FIGS. 7A and 7B, for example.

FIG. 10 illustrates an example lookup table 1000 that associates read-to-read delay ranges 1102 with respective read count thresholds 1104 that can trigger random scans in accordance with some embodiments. The lookup table 1000 can be a data structure that includes one or more records. The table 1000 includes a first record specifying a first delay range (e.g., 0 to Th1) and an associated first random scan trigger count (e.g., 10000 reads), and a second record specifying a second delay range (e.g., Th1 to a maximum numeric value) and an associated second random scan trigger count (e.g., 5000 reads). A probabilistic media management scan can be performed at a specified frequency, which can be specified in terms of a number N of reads. Thus, a the media management component 113 can determine, every N reads, whether to perform a media management scan. The number N can be determined based on the R2R delay. When a read request is received, the media management component 113 can determine how many reads have been performed since a previous probabilistic scan. If the number of reads since the previous scan is equal to N, then the media management scan can be performed. In one example, the media management component 113 can determine based on a random value whether to proceed to perform a media scan in response to the number of scans being equal to N. The value N can be determined based on the R2R delay. For example, as specified in the table 1000, the media management component 113 can determine that N is 10000 reads if the R2R delay is in the first delay range (which corresponds to the fast read disturb regime), or N is 5000 reads if the R2R delay is in the second delay range (which corresponds to the latent read disturb regime). That is, the probabilistic scan can occur twice as frequently in the latent regime as compared to the fast read regime. In the table 1000, the trigger count for the fast regime (e.g., 10000) can be determined as a number of physical reads, and the trigger count for the latent regime can be determined as a number of "equivalent reads" in the latent regime that correspond to the same amount of degradation (e.g., RWB loss) as 10000 reads in the physical regime. For example, 2 reads in the latent regime can correspond to 1 read in the fast regime, so the frequency of the probabilistic scan in the latent regime is determined by multiplying the frequency of the fast regime by 2. Thus, in the latent regime, a probabalistic scan can occur every 5000 reads, whereas in the fast regime a probabilistic scan can occur every 10000 reads in this example.

FIG. 11 illustrates an example lookup table 1100 that associates read-to-read delay ranges 1104 with respective read counter increment values 1108 for different temperature ranges 1104 in accordance with some embodiments. The lookup table 1100 can be a data structure that includes one or more records. The table 1000 includes a first set of records associated with a first temperature range (e.g., 0-40 degrees C.) and a second set of records associated with a second temperature range (e.g., greater than 40 degrees C.). The records in the first set are to be used to determine read counter increment values if a device temperature is in the first range, and the second set of records are to be used to determine rea counter increment values if the device temperature is in the second range. The first set of records includes a first record specifying a first delay range (e.g., 0 to Th1) and an associated first read counter increment value (e.g., 1.5) and a second record specifying a second delay range (e.g., Th1=1 second to a maximum numeric value) and an associated second read counter increment value (e.g., 2.5 reads). The second set of records includes a third record specifying a third delay range (e.g., 0 to Th1) and an associated first read counter increment value (e.g., 1) and a fourth record specifying a fourth delay range (e.g., Th1 to a maximum numeric value) and an associated second read counter increment value (e.g., 2.5 reads).

Figure 12:
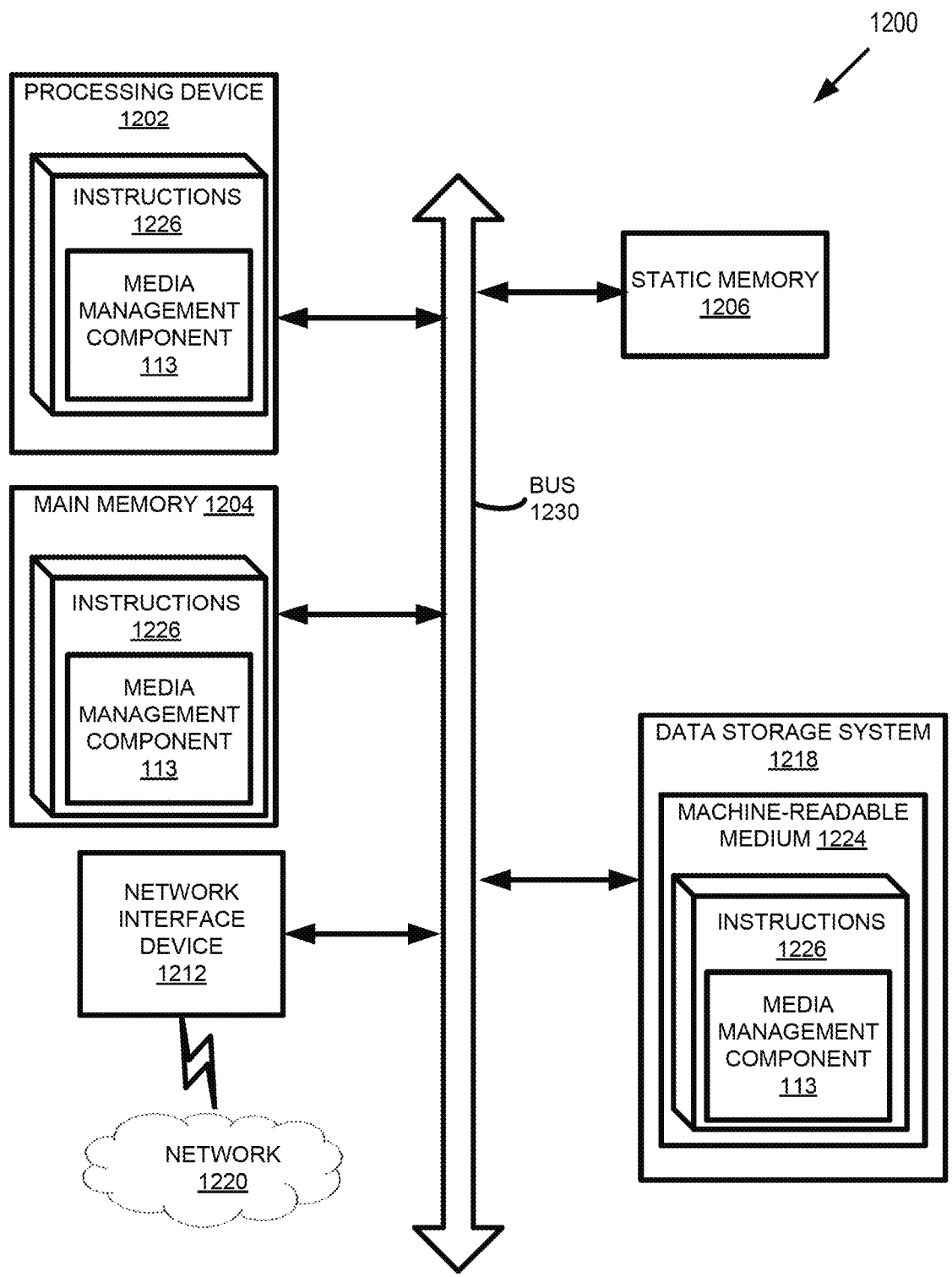
FIG. 12 is a block diagram of an example computer system in which implementations of the present disclosure can operate.

FIG. 12 illustrates an example machine of a computer system 1200 within which a set of instructions, for causing the machine to perform any one or more of the methodologies discussed herein, can be executed. In some embodiments, the computer system 1200 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to a media management component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage system 1218, which communicate with each other via a bus 1230.

Processing device 1202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein. The computer system 1200 can further include a network interface device 1208 to communicate over the network 1220.

The data storage system 1218 can include a machine-readable storage medium 1224 (also known as a computer-readable medium) on which is stored one or more sets of instructions 1226 or software embodying any one or more of the methodologies or functions described herein. The instructions 1226 can also reside, completely or at least partially, within the main memory 1204 and/or within the processing device 1202 during execution thereof by the computer system 1200, the main memory 1204 and the processing device 1202 also constituting machine-readable storage media. The machine-readable storage medium 1224, data storage system 1218, and/or main memory 1204 can correspond to the memory sub-system 110 of FIG. 1A.

In one embodiment, the instructions 1226 include instructions to implement functionality corresponding to a media management component (e.g., the media management component 113 of FIG. 1A). While the machine-readable storage medium 1224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device comprising a plurality of memory blocks; and
   a processing device, operatively coupled to the memory device, the processing device to:
   responsive to receiving a request to read a memory block from the memory device, determine a time difference between a current time and a timestamp associated with the memory block;
   determine whether the time difference satisfies a first threshold increment criterion;
   responsive to determining that the time difference satisfies the first threshold increment criterion, increment a read counter associated with the memory block by a first increment value associated with the first threshold increment criterion;

determine that the read counter associated with the memory block exceeds a scan threshold value specified by a threshold scan criterion; and responsive to determining that the read counter exceeds the scan threshold value specified by the threshold scan criterion, perform a media scan with respect to the memory block.

2. The system of claim 1, wherein the first threshold increment criterion specifies a first threshold delay value, and the time difference satisfies the first threshold increment criterion if the time difference is less than or equal to the first threshold delay value.

3. The system of claim 1, wherein the first threshold increment criterion specifies a first delay range, the first delay range has a first end specified by a first threshold delay value, and the time difference satisfies the first threshold increment criterion if the time difference is in the first delay range.

4. The system of claim 3, wherein the first delay range corresponds to a fast read disturb regime.

5. The system of claim 1, wherein the processing device is further to:

determine whether the time difference satisfies a second threshold increment criterion; and responsive to determining that the time difference satisfies the second threshold increment criterion, increment the read counter associated with the memory block by a second increment value associated with the second threshold increment criterion, wherein the second increment value is greater than the first increment value.

6. The system of claim 5, wherein the second threshold increment criterion comprises a second delay range, the second delay range has a first end specified by a first threshold delay value, and the time difference satisfies the second threshold increment criterion if the time difference is in the second delay range.

7. The system of claim 6, wherein the second delay range has a second end specified by a second threshold delay value, and wherein the time difference satisfies the second threshold increment criterion if the time difference is between the first threshold delay value and the second threshold delay value.

8. The system of claim 6, wherein the second delay range corresponds to a latent read disturb regime.

9. The system of claim 3, wherein the processing device is further to:

identify the first threshold delay value in a data structure, wherein the data structure comprises a record that associates the first threshold delay value with the first increment value.

10. The system of claim 1, wherein the processing device is further to:

measure a current temperature associated with the memory device; and identify, from a set of temperature ranges, a temperature range that includes the current temperature associated with a memory sub-system, wherein the first threshold increment criterion is associated with the temperature range.

11. A method comprising:

responsive to receiving a request to read a memory block from a memory device, determine a time difference between a current time and a timestamp associated with the memory block;

determining whether the time difference satisfies a first threshold increment criterion;

responsive to determining that the time difference satisfies the first threshold increment criterion, incrementing a first read counter associated with the memory block;

determine that a value of the first read counter exceeds a scan threshold value specified by a first threshold scan criterion that corresponds to a fast read disturb regime; and responsive to determining that the value of the first read counter exceeds the scan threshold value specified by the first threshold scan criterion, perform a media scan with respect to the memory block.

12. The method of claim 11, wherein the first threshold increment criterion comprises a first delay range that corresponds to the fast read disturb regime, and the time difference satisfies the first threshold increment criterion if the time difference is in the first delay range.

13. The method of claim 11, further comprising:

determining whether the time difference satisfies a second threshold increment criterion;

responsive to determining that the time difference satisfies the second threshold increment criterion, incrementing a second read counter associated with the memory block;

determine that a value of the second read counter satisfies a second threshold scan criterion that corresponds to a latent read disturb regime; and responsive to determining that the value of the second read counter satisfies the second threshold scan criterion, perform the media scan with respect to the memory block.

14. The method of claim 13, wherein the second threshold increment criterion comprises a second delay range that corresponds to the latent read disturb regime, and the time difference satisfies the second threshold increment criterion if the time difference is in the second delay range.

15. A non-transitory machine-readable storage medium storing instructions that cause a processing device to perform operations comprising:

responsive to receiving a request to read a memory block from a memory device, determine a time difference between a current time and a timestamp associated with the memory block;

determine whether the time difference satisfies a first threshold increment criterion;

responsive to determining that the time difference satisfies the first threshold increment criterion, increment a read counter associated with the memory block by a first increment value associated with the first threshold increment criterion;

determine that the read counter associated with the memory block exceeds a scan threshold value specified by a threshold scan criterion; and responsive to determining that the read counter exceeds the scan threshold value specified by the threshold scan criterion, perform a media scan with respect to the memory block.

16. The non-transitory machine-readable storage medium of claim 15, wherein the first threshold increment criterion specifies a first threshold delay value, and the time difference satisfies the first threshold increment criterion if the time difference is less than or equal to the first threshold delay value.

17. The non-transitory machine-readable storage medium of claim 15, wherein the first threshold increment criterion specifies a first delay range, the first delay range has a first end specified by a first threshold delay value, and the time difference satisfies the first threshold increment criterion if the time difference is in the first delay range.

18. The non-transitory machine-readable storage medium of claim 17, wherein the first delay range corresponds to a fast read disturb regime.

19. The non-transitory machine-readable storage medium of claim 15, wherein the operations further comprise:
   determine whether the time difference satisfies a second threshold increment criterion; and
   responsive to determining that the time difference satisfies the second threshold increment criterion, increment the read counter associated with the memory block by a second increment value associated with the second threshold increment criterion, wherein the second increment value is greater than the first increment value.

20. The non-transitory machine-readable storage medium of claim 19, wherein the second threshold increment criterion comprises a second delay range, the second delay range has a first end specified by a first threshold delay value, and the time difference satisfies the second threshold increment criterion if the time difference is in the second delay range.

* * * * *